(12) United States Patent
Lyerly

(10) Patent No.: US 7,717,771 B1
(45) Date of Patent: May 18, 2010

(54) ANGLE GRINDER AND ANGLE GRINDER SPINDLE-COLLET ADAPTOR

(76) Inventor: Dennis J. Lyerly, 1513 Patricia Dr., St. Cloud, MN (US) 56301

( * ) Notice: Subject to any disclaimer, the term of this patent is extended or adjusted under 35 U.S.C. 154(b) by 478 days.

(21) Appl. No.: 11/772,697

(22) Filed: Jul. 2, 2007

Related U.S. Application Data

(60) Provisional application No. 60/806,453, filed on Jun. 30, 2006.

(51) Int. Cl.
*B24B 27/08* (2006.01)
(52) U.S. Cl. .................. 451/342; 279/46.3; 451/358; 451/359
(58) Field of Classification Search ............. 279/46.3; 451/342, 343, 344, 357, 358, 359
See application file for complete search history.

(56) References Cited

U.S. PATENT DOCUMENTS

| | | | |
|---|---|---|---|
| 1,952,109 A | 3/1934 | Woodward | |
| 2,272,185 A | 2/1942 | Chittenden | |
| 2,359,594 A | 10/1944 | John et al. | |
| 2,400,187 A | 5/1946 | Bakewell | |
| 2,478,195 A | 8/1949 | Ernest | |
| 2,514,241 A | 7/1950 | Howland | |
| 2,606,366 A | 8/1952 | Stevens | |
| 3,026,116 A | 3/1962 | Marini, Sr. | |
| 3,411,796 A | 11/1968 | Decker | |
| 3,719,367 A | 3/1973 | Baturka | |
| 4,046,390 A * | 9/1977 | Dunham | 279/46.8 |
| 4,238,167 A | 12/1980 | Brugger et al. | |
| 4,398,797 A | 8/1983 | Wedertz et al. | |
| 4,468,895 A | 9/1984 | Signorelli | |
| 4,662,116 A | 5/1987 | Erani | |
| 4,690,415 A * | 9/1987 | Holdridge | 279/4.09 |
| 4,808,049 A | 2/1989 | Cook | |
| 4,902,177 A | 2/1990 | Burnett | |
| 5,039,245 A | 8/1991 | Hansen | |
| 5,040,340 A * | 8/1991 | Bischof et al. | 451/357 |
| 5,056,268 A * | 10/1991 | Wolff | 451/357 |
| 5,157,873 A | 10/1992 | Rudolf et al. | |
| 5,316,324 A * | 5/1994 | Hufe, Jr. | 279/51 |
| 5,431,416 A * | 7/1995 | Thornton | 279/4.08 |
| 5,593,258 A | 1/1997 | Matsumoto et al. | |
| 5,806,859 A * | 9/1998 | Saccomanno, III | 279/143 |
| 6,053,804 A | 4/2000 | Parulski | |
| 6,062,574 A * | 5/2000 | Yorde | 279/49 |
| 6,508,475 B1 * | 1/2003 | Strodtman et al. | 279/46.3 |
| 6,588,993 B2 | 7/2003 | Omi | |
| 6,676,340 B2 | 1/2004 | Kress et al. | |
| 6,854,741 B2 | 2/2005 | Lopez | |
| 6,915,722 B2 | 7/2005 | Komine | |
| 7,252,467 B2 * | 8/2007 | Miller | 409/233 |

\* cited by examiner

*Primary Examiner*—Timothy V Eley
(74) *Attorney, Agent, or Firm*—Albert W. Watkins

(57) ABSTRACT

A simple three piece machined steel Collet-Spindle Adaptor for angle grinders includes a hat-shaped base having interior threading for coupling with a threaded spindle on an angle grinder. A sleeve extends therefrom and has an interior surface which engages with a collet. The preferred adaptor converts an angle grinder to accept die grinding tools and other similar tools, thereby providing flexibility of tooling, flexibility of application and work area, ergonomics in operator comfort by providing two hand operation, safety in lower operating tool speed, and reduced cost as an additional die grinder and expensive air compressor are not required. Simple machined design allows rapid change over and small size allows easy toolbox storage.

12 Claims, 3 Drawing Sheets

ANGLE GRINDER AND ANGLE GRINDER SPINDLE-COLLET ADAPTOR

CROSS REFERENCE TO RELATED APPLICATIONS

This application claims priority to U.S. provisional application Ser. No. 60/806,453 filed Jun. 30, 2006 of the same title and naming the present inventor, the contents which are incorporated herein by reference in entirety.

BACKGROUND OF THE INVENTION

1. Field of the Invention

This invention pertains generally to cutting or material removal by use of a rotating axially moving tool, and more particularly to tool supports used therewith. More particularly, this invention relates to angle and die grinders, and in a most specific manifestation to an adaptor which allows the use of ⅛ inch and ¼ inch arbor shaft die grinder tooling with electric angle grinders.

2. Description of the Related Art

Angle and die grinders are used primarily in the removal of material by grinding, polishing, and sanding surface imperfections, welds, oxidation, etc. This process is achieved by utilizing flat sanding pads, flat type 27 grinding wheels varying in size from 4 inches to 9 inches in diameter, and wire brush wheels. Angle grinders are portable, hand held, electric tools with 110 volt AC power requirements. They range in size from 4 inch wheel capacity to 9 inch wheel capacity with rated speeds of approximately 10,000 revolutions per minute (RPM).

Die grinders typically use smaller cutting tools or grinding points with ⅛ inch or ¼ inch arbor shafts for material removal. Die grinders are commonly used for smaller areas, inside diameters or areas that cannot be accessed with larger angle grinder tooling. In addition, die grinders are usually smaller, with ⅛ inch and ¼ inch tooling capacity determined by the size of the collet or the collet reducer used. Die grinders are usually pneumatic tools, and require an air compressor capable of providing supply air at a pressure of 90 pounds per square inch (PSI), or they are large, expensive 110 volt AC powered tools. Operating speeds are approximately 20,000 revolutions per minute (RPM).

As may be apparent, angle grinders and die grinders use distinctly different tooling to remove material. While grinder manufacturers are continuing to improve flexibility of application, ergonomics and safety, reduce costs, and improve performance of angle and die grinders, insofar as the present inventor is aware, no adaptor exists to provide the user with the advantages and benefits listed in a single tool.

While in the art of angle and die grinding, no adaptors exist which perform suitable conversion of an angle grinder to utilize die grinding tools, adaptors which convert one tool into another are known in other arts. Exemplary of such adaptors, the contents of each which are incorporated herein by reference, include U.S. Pat. No. 1,952,109 by Woodward, entitled "Collet chuck"; U.S. Pat. No. 2,272,185 by Chittenden, entitled "Collet chuck"; U.S. Pat. No. 2,359,594 by Turenchalk et al, entitled "Collet and rod grinder"; U.S. Pat. No. 2,478,195 by Hull, entitled "Collet adapter;" U.S. Pat. No. 2,514,241 by Howland, entitled "Chuck collet adapter;" U.S. Pat. No. 3,026,116 by Marini SR, entitled "Quick-change tool adapter;" U.S. Pat. No. 3,411,796 by Decker, entitled "Workpiece gripping bushing;" U.S. Pat. No. 3,719,367 by Baturka, entitled "Collet chuck for threaded shank tools;" U.S. Pat. No. 4,238,167 by Brugger et al, entitled "Toolholder adapter;" U.S. Pat. No. 4,468,895 by Signorelli, entitled "Surface grinder attachment;" U.S. Pat. No. 4,662,116 by Erani, entitled "Grinding attachment;" U.S. Pat. No. 4,808,049 by Cook, entitled "Cam actuated collet tool holder;" U.S. Pat. No. 4,902,177 by Burnett, entitled "Rapid change tool cutter and driving system;" U.S. Pat. No. 5,039,245 by Hansen, entitled "Assembly for clamping rotary cutting tool to shaft;" U.S. Pat. No. 5,056,268 by Wolff, entitled "Accessory device for angle grinder;" U.S. Pat. No. 5,157,873 by Rudolf et al, entitled "Portable grinder with quick-acting chucking device;" U.S. Pat. No. 5,593,258 by Matsumoto et al, entitled "Tool holder;" U.S. Pat. No. 6,053,804 by Parulski, entitled "Grinder attachment for precision grinding machines;" U.S. Pat. No. 6,854,741 by Lopez, entitled "Universal collet adapter tool;" and U.S. Pat. No. 6,915,722 by Komine, entitled "Clamping nut and tool holder with the clamping nut, and spanner." Webster's New Universal Unabridged Dictionary, Second Edition copyright 1983, is additionally incorporated herein by reference in entirety for the definitions of words and terms used herein which are not otherwise explicitly defined.

In spite of the many collet adaptors of the prior art, there still remains a need for an adaptor well-suited to converting an angle grinder to use die grinding tools.

SUMMARY OF THE INVENTION

According to a most preferred embodiment of the present invention, a three piece machined steel Collet-Spindle Adaptor has a ⅝ inch-11 female thread in the base to mount on standard angle grinder ⅝ inch-11 male thread spindle. The Collet-Spindle Adaptor is secured to the angle grinder spindle with a common ¾ inch wrench or a spanner wrench such as is commonly supplied with the angle grinder. The Collet-Spindle Adaptor body is hollow to allow a 1½ inch long tool shaft to be utilized. The top of the Collet-Spindle Adaptor is threaded to allow a locknut to secure the collet and tooling inside the Collet-Spindle Adaptor body.

In a first manifestation, the invention is, in combination, an angle grinder and an angle grinder spindle-collet adaptor. The combination angle grinder and angle grinder spindle-collet adaptor is operable in further combination with die grinder attachments and tools. The angle grinder comprises a handle for manual manipulation and spatial positioning of the angle grinder. A threaded output shaft is coupled with and rotated by a motive power source. The angle grinder spindle-collet adaptor comprises a sleeve, a collet nut engaged with the sleeve and defining a cavity therein, and a longitudinally extensive collet held within the cavity and compressible radially about a longitudinal axis. The collet is compressed responsive to rotation between the collet nut and sleeve. A support base is coupled with the sleeve distal to the collet nut, and has an open-end wrench coupling and a spanner wrench coupling. At least one of the sleeve and support base are internally threaded and operatively threaded onto the threaded output shaft.

In a second manifestation, the invention is a grinding tool holder coupling a die grinder tool to an angle grinder having a male-threaded angle grinder spindle. A hollow body has a female threaded base that allows the tool holder body and tool locking device to mount to the male-threaded angle grinder spindle. The hollow body also has a male threaded locking end distal to the base, and at least two opposed flat surfaces on an exterior suitable for engagement with an open-end wrench. A plate is provided adjacent to and extending radially from the female threaded base and has therein at least two spanner wrench engaging holes. A collet is installed in the male threaded locking end of the hollow body. A threaded lock nut is secured to the collet and the collet holds any tool or work piece captured therein within the hollow body.

OBJECTS OF THE INVENTION

Exemplary embodiments of the present invention solve inadequacies of the prior art by providing an improved angle grinding operation. A first object of the invention is to allow flexibility of tooling. A second object of the invention is to improve ergonomics and operator comfort for two hand operation and better positioning of the grinder. Another object of the present invention is to enable a safer process by using a lower revolution per minute hand tool allowing safer tooling speeds. A further object of the invention is to provide possible cost savings, as an operator docs not have to purchase a separate die grinder and expensive air compressor to use die grinder tooling. Yet another object of the present invention is to permit flexibility of use in remote locations, since only one grinder would then be required and the need for an air hose to the work area is eliminated.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

REFERENCE NUMERALS

Figure 1:
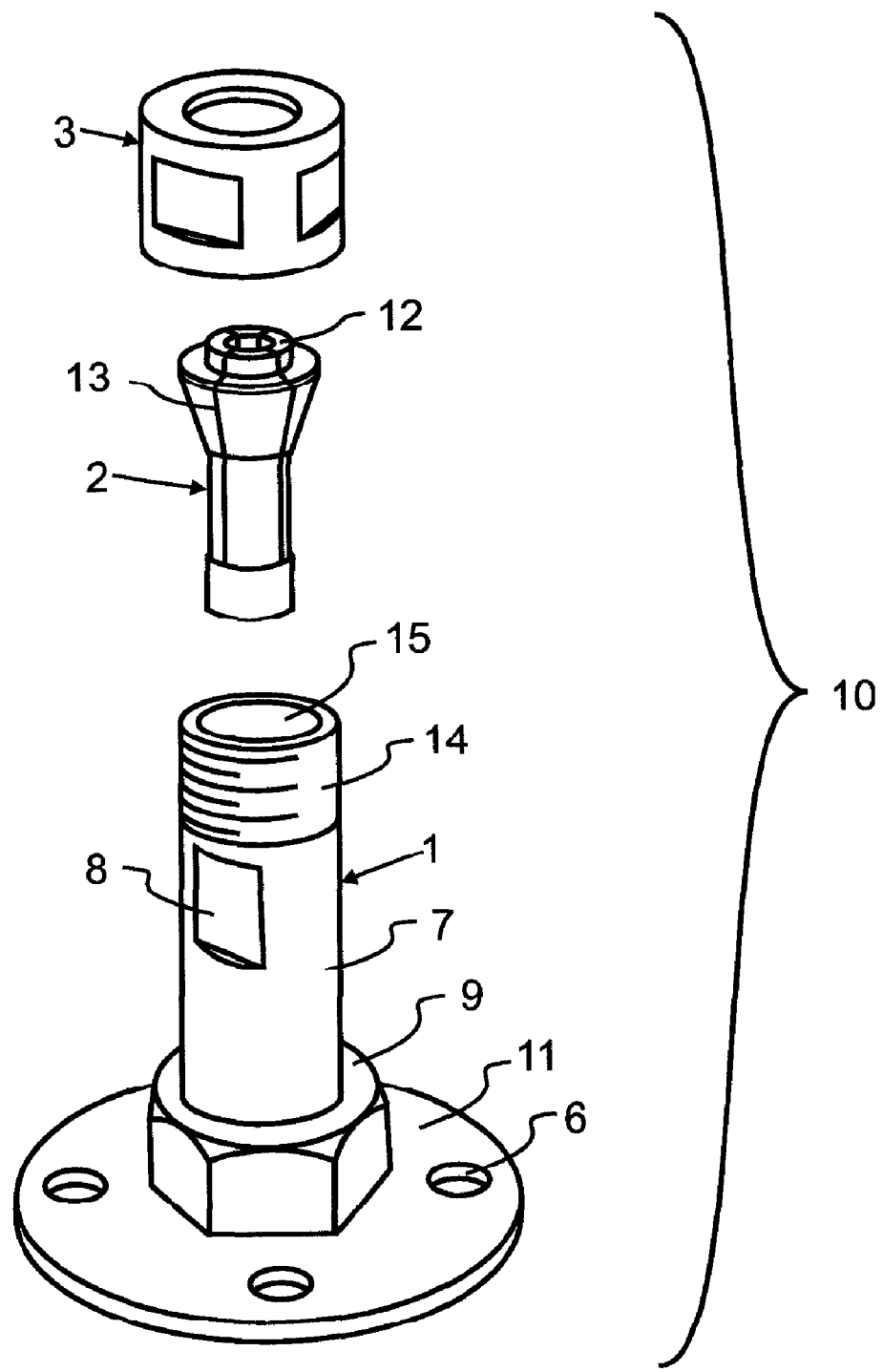
FIG. 1 illustrates a preferred embodiment of the invention from exploded and slightly projected front plan view.
Figure 2:
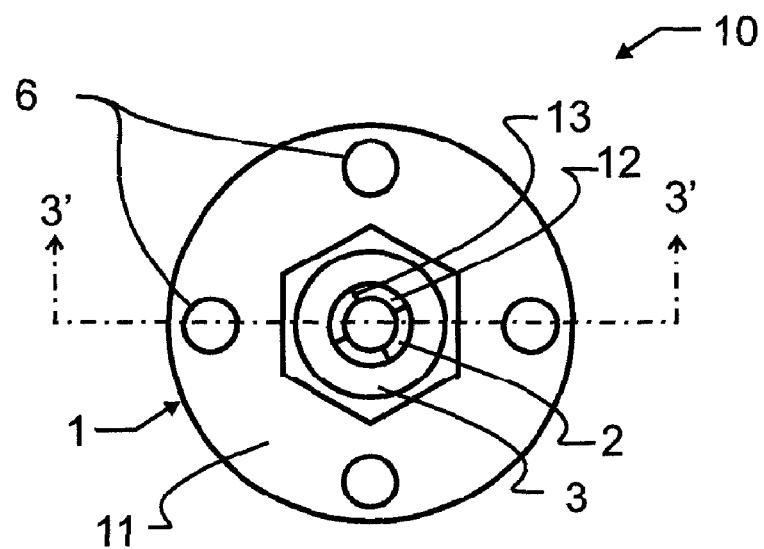
FIG. 2 illustrates the preferred embodiment of FIG. 1 from top plan view.
Figure 3:
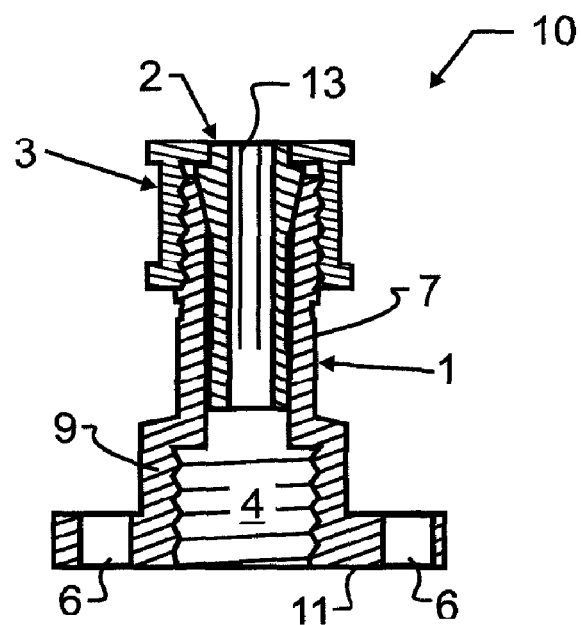
FIG. 3 illustrates the preferred embodiment of FIG. 1 from sectional plan view taken along the line 3' of FIG. 2.
Figure 4:
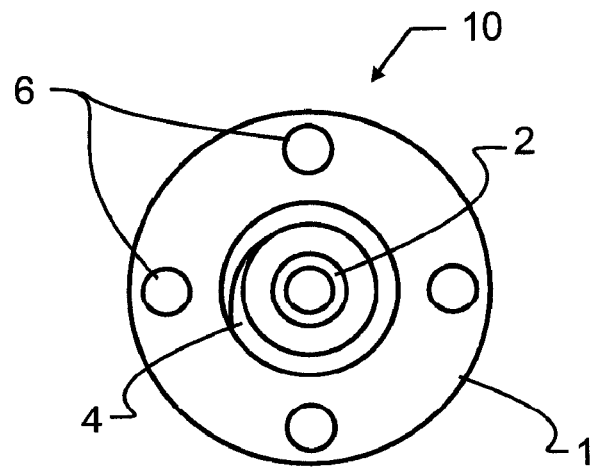
FIG. 4 illustrates the preferred embodiment of FIG. 1 from bottom view.

1—Adaptor body
2—Adaptor collet ⅛ or ¼ inch
3—Adaptor collet locknut
4—⅝ inch-11 female thread
5—⅝ inch-11 male thread
6—Base holes compatible with spanner wrench
7—sleeve
8—flats on sleeve
9—nut
10—Angle Grinder Spindle-Collet Adaptor
11—spanner wrench coupling plate
12—collet split top
13—collet slit
14—male sleeve threading
15—tapered interior surface
20—Angle Grinder

DESCRIPTION OF THE PREFERRED EMBODIMENT

For the purposes of the present disclosure, a collet is defined as a slotted or otherwise radially deformable generally cylindrical clamp, which, when tightly engaged with an interior of a sleeve, will likewise tightly engage and hold a generally cylindrical shank, device or part such as a tool or work piece. One or both of the collet or sleeve may be tapered. In the art, most commonly both surfaces are tapered, which helps to ensure proper alignment and smooth clamping. The source of driving force to cause the collet to tightly engage with the tapered interior of a sleeve is most commonly a collet nut which has a relatively larger opening on a first end adapted to pass circumferentially about the collet. The first end is threaded, and engages with exterior threads on the sleeve. A second opposed end of the collet nut is of relatively smaller open diameter, such that the collet will not pass through, while a tool or work piece may. Various types of collets are known in the tooling art, and a more complete understanding of the various types and operations of collets, and the applicability of each to various applications and situations, will be assumed and understood to be incorporated herein.

Manifested in the preferred embodiment, the present invention provides an apparatus for adapting a threaded spindle on an angle grinder to support die grinder tools. In a most preferred embodiment of the invention illustrated in FIGS. 1-4, angle grinder spindle-collet adaptor 10 consists of a hollow adaptor body 1 having a support base comprising nut 9 and spanner wrench coupling plate 11, at least one of which is internally threaded with female thread 4 of body 1. In this preferred embodiment, the combination of nut 9 and spanner wrench coupling plate 11 take on the geometry of a top hat with brim, and, like the top hat, are open internally to female thread 4. Spanner wrench coupling plate 11 is generally shaped like a hardware washer, having an open circular center and generally circular outer perimeter, and is provided with a set of base holes 6 compatible with a spanner-wrench. While the exact number of base holes is not critical, either two or four holes are most preferred, and will ordinarily be placed at equal angular intervals about spanner wrench coupling plate 11.

Extending away from spanner wrench coupling plate 11, but coaxial therewith, is sleeve 7. This sleeve 7 is generally cylindrical on an exterior surface, but may be provided with two or more flats 8 thereon to which an open-end wrench or other suitable device may attach or grab. In some alternative embodiments contemplated herein, either flats 8 or nut 9 may be omitted, particularly where the entire adaptor body 1 is formed from a unitary structure, since in such case the functions performed may be duplicate in nature. Nevertheless, in the preferred embodiment, both flats 8 and nut 9 are used because existing tools may then be used for attaching angle grinder spindle-collet adaptor 10 and associated die grinding tool. Additionally, and as may be apparent, sleeve 7 need not be cylindrical from an exterior perspective, and may instead take on other geometries.

Body 1 is anchored to an angle grinder 20 (visible in FIG. 5) by screwing male thread 5 of angle grinder 20 into female thread 4 of body 1. Body 1 is hollow, at least at both ends, so as to not only thread onto male thread 5, but distal thereto to define a cavity within which to receive a ⅛ or ¼ inch collet 2, which in turn receives standard die grinder tooling. Locking nut 3 screws on to male threads 14, forcing collet split top 12 into tighter engagement with tapered surface 15 of sleeve 7. As collet split top 12 is driven towards spanner wrench coupling plate 11, collet slots 13 will be closed, thereby reducing the open diameter adjacent to collet split top 12. As a result, the tightening of adaptor collet locknut 3 onto threads 14 secures collet 2 and any die grinder tooling to be used.

Figure 5:
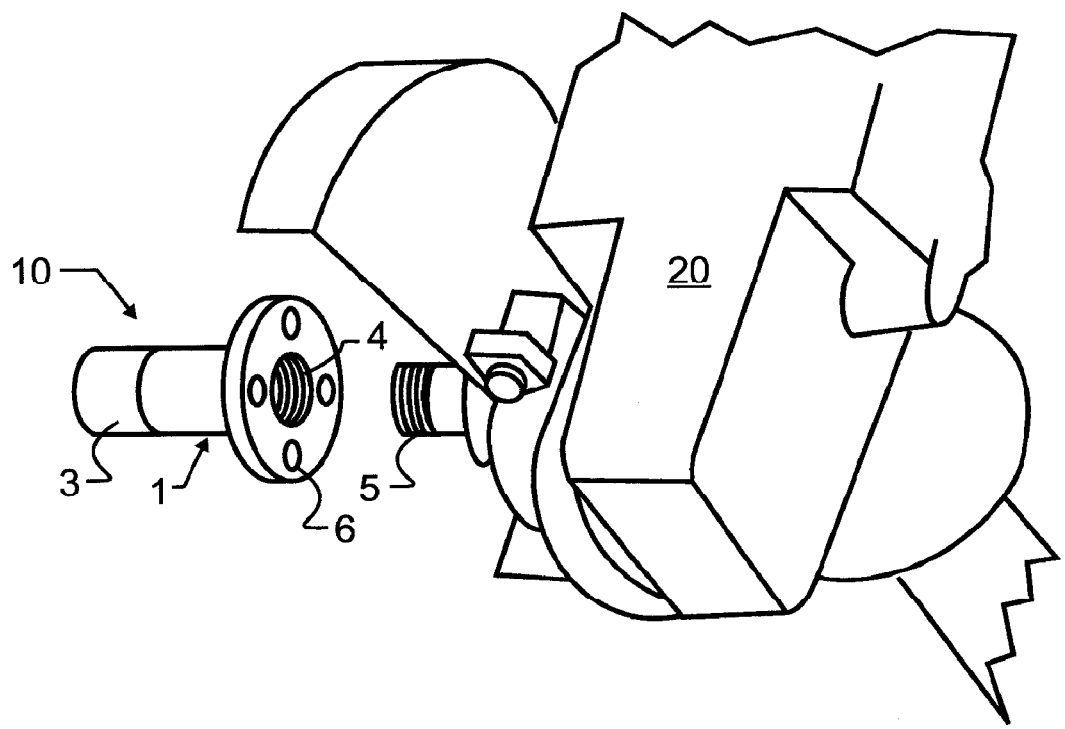
FIG. 5 illustrates a preferred embodiment angle grinder having a ⅝ inch-11 male threaded spindle in combination with the preferred embodiment angle grinder spindle-collet adaptor of FIGS. 1-4 from exploded view.

FIG. 5 shows a right side view of a typical angle grinder 20 with angle grinder spindle-collet adaptor 10 in the mounting position. The Collet-Spindle Adaptor 10 is screwed on to ⅝ inch-11 male threaded spindle 5 of angle grinder 20. It is tightened with a spanner wrench engaging with base holes 6 or a ¾ inch open-end wrench coupled about an exterior hex geometry of nut 9, visible best in FIGS. 1 and 3. The Collet-Spindle Adaptor locknut 3 is loosened and is ready to accept any die grinder tooling. Through the use of collet-spindle adaptor 10, the present invention allows for the use of both die grinding and angle grinder tooling in combination with the angle grinder.

In operation, the angle grinder operator can select to use the Collet-Spindle Adaptor when die grinder operations are required. The angle grinder tooling is removed from angle grinder ⅝ inch-11 male spindle thread 5 with a spanner wrench which will most preferably be provided with angle grinder 20 or with Collet-Spindle Adaptor 10. The Collet-Spindle adaptor ⅝ inch-11 female thread is tightened on to the angle grinder ⅝ inch-11 male spindle thread with the same angle grinder spanner wrench or ¾ inch open end wrench. The required ⅛ inch or ¼ inch die grinder tooling is secured in the collet end of the Collet-Spindle Adaptor 10 and die grinding operations are now possible. The simple three piece design allows for quick change-over from angle grinder to die grinder operations.

From these figures and descriptions, several additional features and options become more apparent. First of all, Collet-Spindle Adaptor 10 may be manufactured from a variety of materials, including many different metals and alloys, or other suitable materials. The specific material used may vary, though special benefits are attainable if several important factors are taken into consideration. Firstly, the adaptor should be sufficiently sturdy to withstand any physical forces exerted upon it, including friction, inertia, and wear and tear generally caused by use. Most preferably, the adaptor will also be relatively corrosion resistant and sufficiently durable to withstand the particular climate for the intended application. Additionally, resistance to thermal shock, abrasion, and hot or molten spray is preferable. While illustrated as a unitary piece, it will further be apparent that adaptor body 1 may alternatively be fabricated from a plurality of suitable components which are welded or otherwise coupled or adhered together to form the desired structure.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, an angle grinder and an angle grinder spindle-collet adaptor, whereby said combination angle grinder and angle grinder spindle-collet adaptor is operable in further combination with die grinder attachments and tools, said angle grinder comprising:
   a handle for manual manipulation and spatial positioning of said angle grinder;
   a threaded output shaft; and
   a motive power source coupled with and operative to rotate said output shaft;
   said angle grinder spindle-collet adaptor comprising:
   a sleeve;
   a collet nut engaged with said sleeve and defining a cavity therewith;
   a longitudinally extensive collet held within said cavity and compressible radially about a longitudinal axis responsive to rotation between said collet nut and said sleeve; and
   a support base coupled with said sleeve and distal to said collet nut, said support base having an open-end wrench coupling and a spanner wrench coupling;
   at least one of said sleeve and support base internally threaded and operatively threaded to said threaded output shaft.

2. The combination angle grinder and angle grinder spindle-collet adaptor of claim 1, wherein said open-end wrench coupling further comprises a hex nut.

3. The combination angle grinder and angle grinder spindle-collet adaptor of claim 2, wherein said spanner wrench coupling further comprises a plate having an internal hole co-axial with said collet longitudinal axis and at least two spanner wrench engaging holes extending longitudinally parallel to said collet longitudinal axis but offset therefrom.

4. The combination angle grinder and angle grinder spindle-collet adaptor of claim 3, wherein said support base further comprises a top-hat configuration, said plate adjacent to said hex nut.

5. The combination angle grinder and angle grinder spindle-collet adaptor of claim 4, wherein said hex nut is internally threaded.

6. A grinding tool holder coupling a die grinder tool to an angle grinder having a male-threaded angle grinder spindle, comprising:
   a hollow body having a female threaded base allowing said tool holder body and tool locking device to mount to said male-threaded angle grinder spindle, a male threaded locking end distal to said base, and at least two opposed flat surfaces on an exterior of said hollow body suitable for engagement with an open-end wrench;
   a plate adjacent to and extending radially from said female threaded base and having therein at least two spanner wrench engaging holes;
   a collet installed in said male threaded locking end of said hollow body; and
   a threaded lock nut securing said collet and any tool or work piece captured therein within said hollow body.

7. The grinding tool holder of claim 6, wherein said plate further comprises an internal hole co-axial with a hollow body longitudinal axis, and said at least two spanner wrench engaging holes extending longitudinally parallel to said hollow body longitudinal axis but offset therefrom.

8. The grinding tool holder of claim 6, further comprising a nut adjacent to said plate, wherein said plate and nut in combination further comprises a top-hat configuration.

9. The grinding tool holder of claim 8, wherein at least one of said plate and said hex nut is internally threaded.

10. The grinding tool holder of claim 6, wherein said collet is tapered.

11. The grinding tool holder of claim 6, wherein said hollow body is tapered.

12. The grinding tool holder of claim 6, wherein said collet and said hollow body each comprise tapered surfaces, and said tapered surface of said hollow body engages with said tapered surface of said collet.

* * * * *